US012789647B2

(12) United States Patent
Terauchi et al.

(10) Patent No.: US 12,789,647 B2
(45) Date of Patent: Nov. 10, 2026

(54) CELL PACK STRUCTURE FOR ELECTRIC VEHICLE

(71) Applicant: MITSUBISHI JIDOSHA KOGYO KABUSHIKI KAISHA, Tokyo (JP)

(72) Inventors: Takuya Terauchi, Tokyo (JP); Nobuyoshi Suzuki, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 476 days.

(21) Appl. No.: 18/578,271

(22) PCT Filed: Nov. 5, 2021

(86) PCT No.: PCT/JP2021/040801
§ 371 (c)(1),
(2) Date: Jan. 10, 2024

(87) PCT Pub. No.: WO2023/079687
PCT Pub. Date: May 11, 2023

(65) Prior Publication Data

US 2024/0383344 A1 Nov. 21, 2024

(51) Int. Cl.
*B60L 50/64* (2019.01)
*H01M 50/204* (2021.01)
(Continued)

(52) U.S. Cl.
CPC ........... *B60L 50/64* (2019.02); *H01M 50/204* (2021.01); *H01M 50/242* (2021.01);
(Continued)

(58) Field of Classification Search
CPC ... B60L 50/64; H01M 50/204; H01M 50/242; H01M 50/249; H01M 50/291;
(Continued)

(56) References Cited

U.S. PATENT DOCUMENTS 9,045,030 B2 6/2015 Rawlinson et al.
10,023,038 B2 7/2018 Rawlinson et al.
(Continued)

FOREIGN PATENT DOCUMENTS

CA 3 120 529 A1 5/2020
EP 3 412 486 A1 12/2018
(Continued)

OTHER PUBLICATIONS

International Search Report for PCT/JP2021/040801 (PCT/ISA/210) mailed on Dec. 21, 2021.
(Continued)

*Primary Examiner* — Helen Oi K Conley
(74) *Attorney, Agent, or Firm* — Birch, Stewart, Kolasch & Birch, LLP

(57) ABSTRACT

Cell modules (3) are aligned on front and rear sides and left and right sides in a tray (2), and a cross member (11) is disposed to cross inside of the tray (2) in a left-right direction between the front and rear cell modules (3). The cross member (11) is configured to have a hollow shape with a front wall (11*e*) and a rear wall (11*f*) coupled with four structure walls (11*a* to 11*d*). An upper notch (16) is formed at an upper edge of the cross member (11), and a lower notch (17) is formed at a lower edge, in a state where third and fourth structure walls (11*c*, 11*d*) are left. Reinforcements (18) are disposed on both left and right sides of the tray (2), and upper and lower flange portions (18*b*, 18*c*) of the left and right reinforcements (18) are joined to outside of side surfaces of the tray (2) on extension lines of the third and fourth structure walls (11*c*, 11*d*) of the cross member (11), respectively, in the up-down direction, thereby to form load path structures on left and right paths along the cross member (11).

4 Claims, 5 Drawing Sheets

(51) Int. Cl.
*H01M 50/242* (2021.01)
*H01M 50/249* (2021.01)
*H01M 50/291* (2021.01)

(52) U.S. Cl.
CPC ....... *H01M 50/249* (2021.01); *H01M 50/291* (2021.01); *H01M 2220/20* (2013.01)

(58) Field of Classification Search
CPC ............ H01M 2220/20; H01M 50/209; B60K 2001/0438; B60K 1/04; Y02E 60/10
See application file for complete search history.

(56) References Cited

U.S. PATENT DOCUMENTS

| | | | |
|---|---|---|---|
| 10,358,048 | B2 | 7/2019 | Hara et al. |
| 10,780,767 | B2 | 9/2020 | Rawlinson et al. |
| 11,088,412 | B2 | 8/2021 | Matecki et al. |
| 2015/0255764 | A1 | 9/2015 | Loo et al. |
| 2019/0081298 | A1 | 3/2019 | Matecki et al. |

FOREIGN PATENT DOCUMENTS

| | | | |
|---|---|---|---|
| JP | 2009-83600 | A | 4/2009 |
| JP | 5372128 | B2 | 12/2013 |
| JP | 2015-170452 | A | 9/2015 |
| JP | 6363656 | B2 | 7/2018 |

OTHER PUBLICATIONS

Extended European Search Report for European Patent Application No. 21963282.5, dated Dec. 2, 2024.

International Preliminary Report on Patentability and English translation of the Written Opinion of the International Searching Authority for International Application No. PCT/JP2021/040801, dated May 16, 2024, with English translation.

CELL PACK STRUCTURE FOR ELECTRIC VEHICLE

TECHNICAL FIELD

The present invention relates to a cell pack structure for an electric vehicle.

BACKGROUND ART

For example, Patent Document 1 discloses a battery structure, which is installed in a rear luggage compartment of a vehicle, in which a partitioning plate is disposed to partition a battery accommodation case into upper and lower parts, a cell module is installed below the partitioning plate, and high-voltage equipment is installed on the partitioning plate. The partitioning plate is provided with a bent portion to achieve protection by causing the partitioning plate to be deformed upward at the bent portion as a boundary and causing the partitioning plate to be separated from the cell module when another vehicle or the like collides from the rear side.

Also, according to Patent Document 2, a plurality of crossing members extending in a vehicle width direction are aligned at predetermined intervals in a front-rear direction inside a cell pack mounted in a vehicle to protect a cell module accommodated in the cell pack when another vehicle causes side collision.

PRIOR ART DOCUMENT

Patent Document

Patent Document 1: Japanese Patent No. 6363656
Patent Document 2: Japanese Patent No. 5372128

SUMMARY OF THE INVENTION

Problems to be Solved by the Invention

However, the technique described in Patent Document 1 only causes the partitioning plate to be deformed in a prescribed deformation mode for the purpose of protecting the cell module. In addition, the technique in Patent Document 2 also provides only an effect that the cell module in the cell pack is protected while rigidity of the cell pack is improved by disposing the plurality of crossing members therein.

Although it is important not only to protect the cell module in the cell pack but also to disperse/absorb a collision load at each part of a vehicle body to reduce deformation of the vehicle body when another vehicle or the like causes side collision since the collision load is input to the cell pack from a side, it is difficult to state that the technique of each patent document is sufficient for the requirement.

The present invention has been made in order to solve such a problem, and an object thereof is to provide a cell pack structure for an electric vehicle capable of reducing deformation of a vehicle body by satisfactorily dispersing/absorbing a collision load input at the time of side collision at each part of the vehicle body.

Means for Solving the Problems

In order to achieve the above object, a cell pack structure for an electric vehicle according to the present invention includes: a tray in which cell modules are accommodated; a cross member that is disposed to cross inside of the tray, includes an upper structure wall and a lower structure wall formed to continue over an entire longitudinal direction at positions separated in an up-down direction, and has a hollow shape; and a pair of reinforcements that are each disposed to correspond to both ends of the cross member, and are joined to outside of a side surface of the tray on an extension line of at least one of the upper structure wall and the lower structure wall of the cross member in the up-down direction.

Therefore, the upper structure wall and the lower structure wall of the cross member continue over the entire longitudinal direction of the cross member at the positions separated in the up-down direction. Also, a fixed point of each reinforcement coincides with the extension line of both ends of the upper structure wall or the lower structure wall in the up-down direction, and a load path structure is thus formed on the path along the cross member crossing the cell pack. Therefore, a collision load at the time of side collision is transmitted to one of the reinforcement, the cross member, and the other reinforcement and is dispersed/absorbed on a vehicle body side.

According to another aspect, the cell modules may be disposed to be separated in the longitudinal direction of the cross member in a two-divided manner, and the cross member may include a notch formed in at least any one of an upper edge and a lower edge to correspond to a clearance between the cell modules and thus have a narrowed up-down width.

Therefore, since a region where the notch is formed in the cross member functions as a crushable zone and is deformed at the time of side collision, deformation of regions corresponding to both sides of the notch is curbed, and damage of the cell modules installed in the regions is prevented. Additionally, since it is easy to adjust a deformation mode of the cross member with the hollow shape when a collision load is input, it is possible to deform the cross member in the prescribed deformation mode at the time of side collision.

According to another aspect, the cell modules may be disposed to be separated in the longitudinal direction of the cross member in a two-divided manner, and the cross member may include a first notch formed in at least any one of an upper edge and a lower edge to correspond to a clearance between the cell modules and a second notch formed in any other one and thus have a narrowed up-down width.

Therefore, since a region where the first notch is formed in the cross member functions as a crushable zone and is deformed at the time of side collision, deformation of regions corresponding to both sides of the notch is curbed, and damage of the cell modules installed in the regions is prevented. Additionally, it is easy to adjust a deformation mode of the cross member with the hollow shape when a collision load is input. Also, since the first and second notches are formed at the upper edge and the lower edge of the cross member, it is easy to adjust the deformation mode, and the cross member can thus be deformed in the prescribed deformation mode at the time of side collision.

According to another aspect, the second notch may have a stepped shape lowering from both sides of the cross member to a center.

Therefore, since the second notch has the stepped shape lowering from the both sides of the cross member to the center, the both sides of the cross member have sufficient up-down widths, and it is thus possible to protect the cell modules that are located on the both sides and are particularly likely to be damaged at the time of side collision. Also, the notch with the stepped shape of the cross member makes it easier to cause stress concentration when a collision load is transmitted, and it is thus easier to adjust the deformation mode.

According to another aspect, the cross member may be disposed right above an underfloor cross fixed to a lower surface of the tray to support the cell pack on a vehicle body side.

Therefore, since the cross member and the underfloor cross with high rigidity coincide with each other, it is possible to enhance rigidity of the cell pack.

Advantageous Effects of the Invention

According to the cell pack structure for an electric vehicle of the present invention, it is possible to reduce deformation of a vehicle body by satisfactorily dispersing/absorbing a collision load input at the time of side collision at each part of the vehicle body.

MODE FOR CARRYING OUT THE INVENTION

First Embodiment

Hereinafter, a first embodiment of a cell pack structure for an electric vehicle that implements the present invention will be described.

Figure 1:
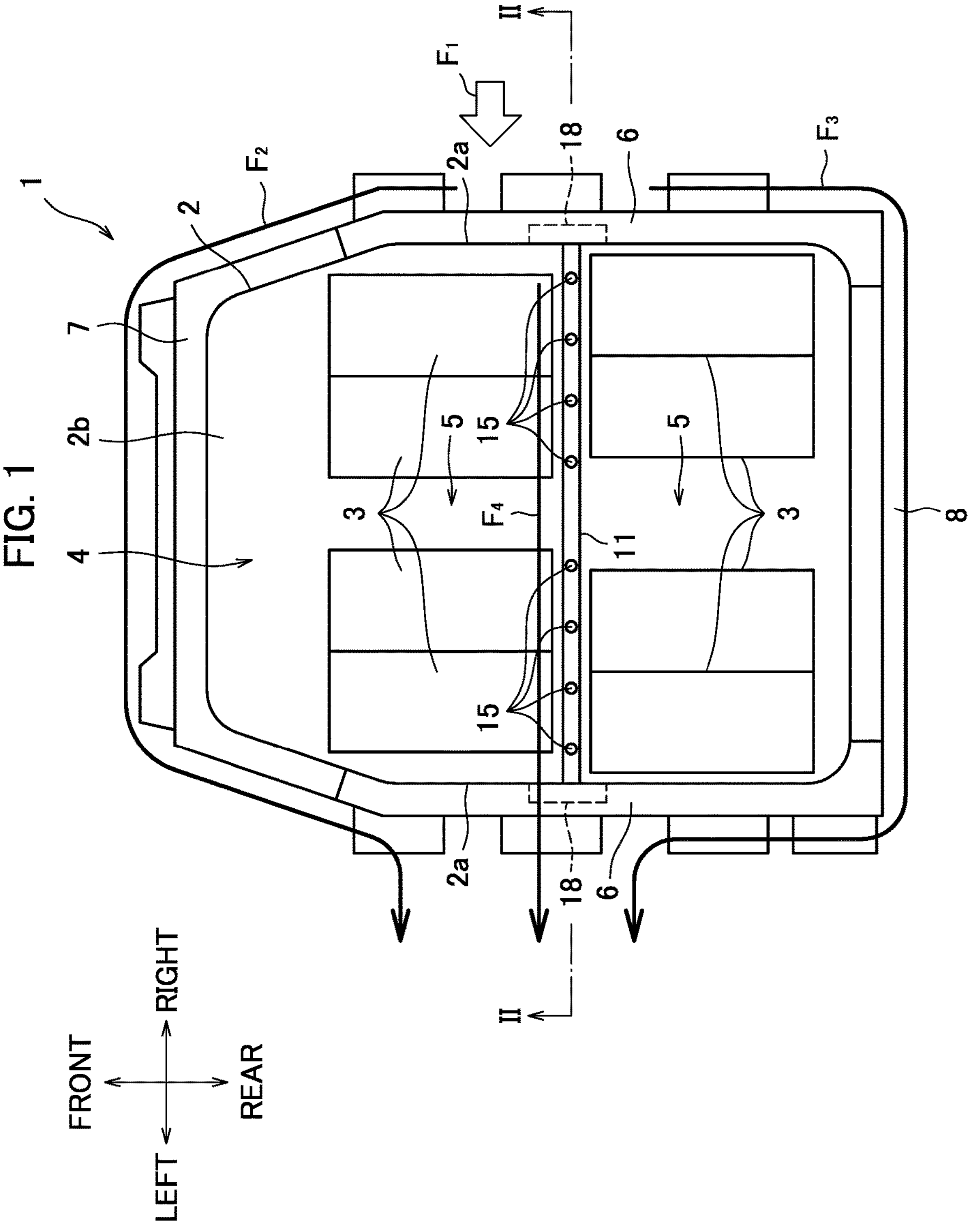
FIG. 1 is a plan view illustrating a cell pack structure for an electric vehicle according to a first embodiment.
Figure 2:
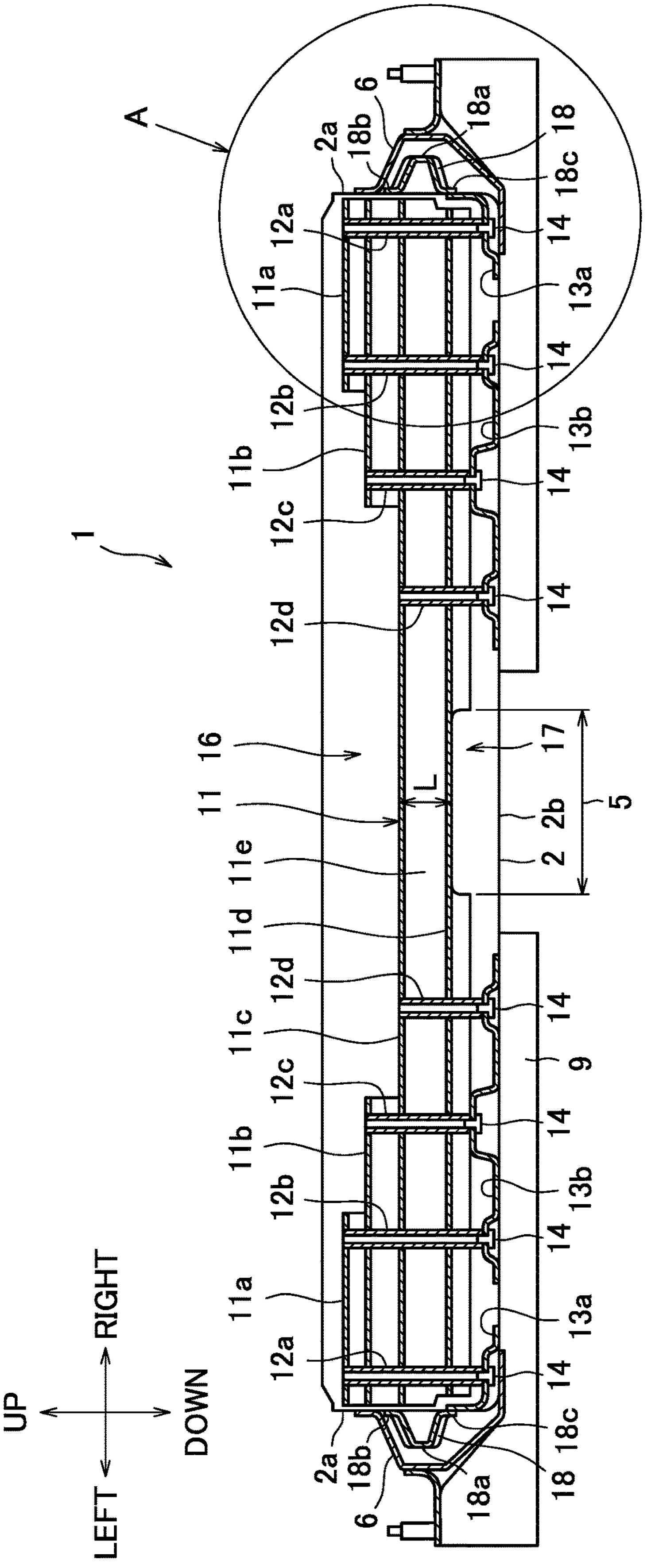
FIG. 2 is a sectional view along II-II in FIG. 1 illustrating a cross member disposed in a cell pack.
Figure 3:
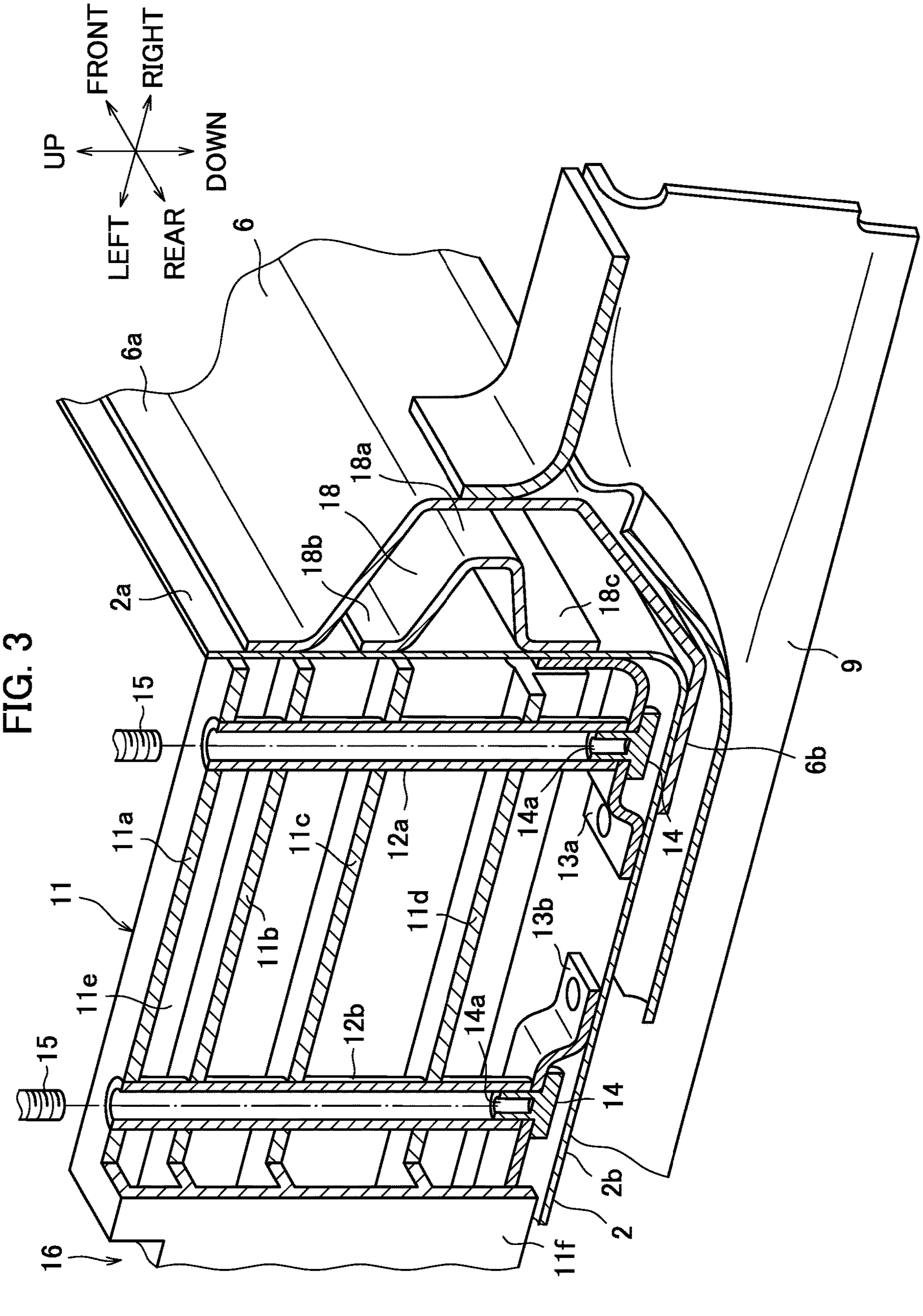
FIG. 3 is a detailed view of the part A in FIG. 2 illustrating a relationship between details of the cross member and a reinforcement.

FIG. 1 is a plan view illustrating the cell pack structure for an electric vehicle according to the present embodiment, FIG. 2 is a sectional view along II-II in FIG. 1 illustrating a cross member disposed in a cell pack, and FIG. 3 is a detailed view of the part A in FIG. 2 illustrating a relationship between details of the cross member and a reinforcement.

The electric vehicle in the present embodiment is configured as a plug-in hybrid vehicle that includes a motor and an engine mounted as a power source for traveling and allows a cell pack that is a power supply for traveling to be charged by an external charging facility. The cell pack is mounted under a floor of a vehicle body in the posture illustrated in FIG. 1, and a front-rear direction and a left-right directions will be expressed in accordance with the vehicle in the following description.

As illustrated in FIG. 1, a tray 2 of a cell pack 1 has a substantially quadrangular shape in a plan view and accommodates eight cell modules 3 in total therein. Each two cell modules 3 form a pair, and four pairs of cell modules 3 in total are aligned on front and rear sides and left and right sides. In other words, the pairs of cell modules 3 are divided into two parts, namely the front and rear sides and the left and right sides. An equipment space 4 is formed at a position in front of the cell modules 3 in the tray 2. Also, the left and right cell modules 3 are disposed to be separated, and an equipment space 5 (corresponding to the "clearance" of the present invention) is formed therebetween. Although not illustrated in the drawings, electric devices such as a battery module unit (BMU) for managing/controlling charging and discharging performance of the cell modules and a junction box for connecting/disconnecting a cell circuit, for example, are accommodated in these equipment spaces 4 and 5.

The periphery of the tray 2 is surrounded by a pair of left and right side frames 6, a front frame 7, and a rear frame 8 in a plan view. As illustrated in FIG. 3, for example, an upper portion 6*a* of the side frame 6 is welded to a side surface 2*a* of the tray 2, a lower portion 6*b* is welded to a lower surface 2*b* of the tray 2, and a closed section is thereby formed between the side frame 6 and the tray 2. Although not illustrated in the drawings, the same applies to the front frame 7 and the rear frame 8. A plurality of underfloor crosses 9 are fixed to the lower surface 2*b* of the tray 2 at predetermined intervals in the front-rear direction, and both left and right end portions of each underfloor cross 9 are coupled to a side member of the vehicle body, which is not illustrated, to suspend/support the tray 2 with respect to the vehicle body side.

The front and rear cell modules 3 are disposed to be slightly separated, the cross member 11 is disposed therebetween, and the front-rear position of the cross member 11 is also right above one of the plurality of underfloor crosses 9. The cross member 11 in the present embodiment is made of an extruded material of aluminum, has a plate shape linear extending in the left-right direction as a whole, and is disposed to cross the inside of the tray 2. Each of both left and right ends of the cross member 11 faces the inside of the side surface 2*a* of the tray 2 via a slight clearance.

As illustrated in FIG. 3, the cross member 11 has a quadrangular sectional shape which is long in the up-down direction in a side view and has a hollow shape with a front wall 11*e* and a rear wall 11*f* coupled to each other with four horizontal structure walls 11*a* to 11*d*. Each of the structure walls 11*a* to 11*d* extends over the entire longitudinal direction of the cross member 11, and both left and right ends of the cross member 11 are opened. Hereinafter, the structure walls will be referred to as first to fourth structure walls 11*a* to 11*d* in the order from the upper side.

The first structure wall 11*a* forms the upper surface of the cross member 11, each of the second to fourth structure walls 11*b* to 11*d* is disposed below the first structure wall 11*a* at predetermined intervals in the up-down direction, and the front wall 11*e* and the rear wall 11*f* further extend downward from the fourth structure wall 11*d*.

Eight bolt insertion pipes 12*a* to 12*d* in total are inserted into/fixed to the cross member 11 from the upper side at predetermined intervals in the left-right direction. Hereinafter, the two outermost bolt insertion pipes will be referred to as first bolt insertion pipes 12*a*, the two bolt insertion pipes on the inner side thereof will be referred to as second bolt insertion pipes 12*b*, the two bolt insertion pipes on the further inner side will be referred to as third bolt insertion pipes 12*c*, and the two innermost bolt insertion pipes will be referred to as fourth bolt insertion pipes 12*d*. The first and second bolt insertion pipes 12*a* and 12*b* penetrate through all the structure walls 11*a* to 11*d*, the third bolt insertion pipes 12*c* penetrate through the second to fourth structure walls 11*b* to 11*d*, the fourth bolt insertion pipes 12*d* penetrate through the third and fourth structure walls 11*c* and 11*d*, and lower ends of all the bolt insertion pipes 12*a* to 12*d* are located in the vicinity of the lower surface 2*b* of the tray 2.

Four brackets 13*a* and 13*b* in total are disposed in the left-right direction along the cross member 11 on the lower surface 2*b* of the tray 2, and each of the brackets 13*a* and 13*b* is welded to the lower surface 2*b*. Plugs 14 are welded to the two brackets 13*a* on the outer side at positions corresponding to the lower ends of the first bolt insertion pipes 12*a*, respectively, and a female screw 14*a* formed at each plug 14 is opened upward. Similarly, the plugs 14 are welded to the two brackets 13*b* on the inner side at positions corresponding to the lower ends of the second to fourth bolt insertion pipes 12*b* to 12*d*, respectively, and a female screw 14*a* formed at each plug 14 is opened upward. Bolts 15 (only the tip ends are illustrated in FIG. 3) are inserted into the bolt insertion pipes 12*a* to 12*d* from the upper side, and the tip ends thereof are screwed into the female screws 14*a* of the plugs 14 via the inside of the bolt insertion pipes 12*a* to 12*d*. In this manner, the cross member 11 is fastened to each of the brackets 13*a* and 13*b* and is fixed at a predetermined position in the tray 2.

An upper edge and a lower edge of the cross member 11 are cut down into stepped shapes, an upper notch 16 (corresponding to "the notch, the first notch" of the present invention) is thereby formed at the upper edge, and a lower notch (corresponding to "the second notch" of the present invention) is formed at the lower edge. The upper notch 16 will be described. In a region between the left and right second bolt insertion pipes 12*b* (the region on the inner side thereof) of the cross member 11, a part above the second structure wall 11*b* (the front wall 11*e* and the rear wall 11*f* and the first structure wall 11*a*) is cut down with the second structure wall 11*b* left. Also, in a region on a side further inward than the left and right third bolt insertion pipes 12*c*, a part above the third structure wall 11*c* (the front wall 11*e* and the rear wall 11*f* and the second structure wall 11*b*) is cut down with the third structure wall 11*c* left. As a result, the upper notch 16 with the stepped shape lowering in two levels from both the left and right sides to the center is formed at the upper edge of the cross member 11.

Also, the lower notch 17 will be described. In a region on the side further inward than the left and right third bolt insertion pipes 12*c*, a part below the fourth structure wall 11*d* (the front wall 11*e* and the rear wall 11*f*) is cut down with the fourth structure wall 11*d* left. As a result, the lower notch 17 with a quadrangular shape is formed at the center of the lower edge of the cross member 11. Also, the region of the lower notch 17 in the left-right direction corresponds to the equipment space 5 formed between the left and right cell modules 3 illustrated in FIG. 1.

Note that although the lower notch 17 is formed to correspond to the equipment space 5 on the front side with a narrower left-right width as illustrated in FIG. 1 in the present embodiment, the lower notch 17 is not limited thereto and may be caused to correspond to the equipment space 5 on the rear side. Also, the upper notch 16 and the lower notch 17 may be reversed, the upper edge of the cross member 11 may be cut down into the shape corresponding to the lower notch 17, and the lower edge may be cut down into the shape corresponding to the upper notch 16.

As described above, although the cross member 11 is cut down on the upper and lower sides, the third structure wall 11*c* (corresponding to the "upper structure wall" of the present invention) and the fourth structure wall 11*d* (corresponding to the "lower structure wall" of the present invention) are left without being cut down. As a result, the third and fourth structure walls 11*c* and 11*d* continue without being interrupted over the entire longitudinal direction of the cross member 11 at positions separated from each other in the up-down direction.

Moreover, reinforcements 18 are provided at a front-rear position corresponding to the cross member 11 inside a closed section formed by each side frame 6 on both left and right sides of the tray 2. Specifically, each reinforcement 18 has a short front-rear length including the cross member 11 and the vicinity thereof in the front-rear direction as illustrated by the dashed line in FIG. 1. Also, each reinforcement 18 has a shape obtained by causing an upper flange portion 18*b* and a lower flange portion 18*c* to extend from a main body portion 18*a* as illustrated in FIG. 3.

Each reinforcement 18 forms a closed section between itself and the side surface 2*a* by the upper and lower flange portions 18*b* and 18*c* being welded to the outside of the side surface 2*a* of the tray 2. Specifically, the upper flange portion 18*b* of each reinforcement 18 is welded to the outside of the side surface 2*a* of the tray 2 on an extension line of the third structure wall 11*c* of the cross member 11 in the up-down direction. Also, the lower flange portion 18*c* of each reinforcement 18 is welded to the outside of the side surface 2*a* of the tray 2 on an extension line of the fourth structure wall 11*d* of the cross member 11 in the up-down direction.

Next, effects achieved by the cell pack structure for an electric vehicle configured as described above at the time of side collision will be described.

If another vehicle or the like causes side collision from the right side in FIG. 1, for example, a collision load is input to the side frame 6 on the right side as illustrated by the arrow F1. At this time, each of the frames 6 to 8 forming the closed section at the periphery of the cell pack 1 functions as a load path structure. As illustrated by the arrow F2, for example, the collision load is dispersed from the side frame 6 on the right side to the side frame 6 on the left side through the front frame 7 and is then further dispersed to the vehicle body side. Also, as illustrated by the arrow F3, the collision load is dispersed to the side frame 6 through the rear frame 8.

In addition to this, the cross member 11 and the left and right reinforcements 18 cooperate to form a load pass structure on the path along the cross member 11 crossing the cell pack 1 as well, and the collision load is dispersed to the path as illustrated by the arrow F4.

Hereinafter, a collision load dispersed condition will be described. The collision load is input to the reinforcements 18 via the side frames 6 and causes the reinforcements 18 to be deformed leftward. The upper and lower flange portions 18*b* and 18*c* of the reinforcements 18 are welded to the outside of the side surface 2*a* of the tray 2 on the extension lines of the third and fourth structure walls 11*c* and 11*d* of the cross member 11, respectively, in the up-down direction. In this manner, since the fixed point of each reinforcement 18 coincides with the extension lines of both ends of the upper structure wall 11*c* or the lower structure wall 11*d*, each of the flange portions 18*b* and 18*c* collides against and presses the right end of each of the corresponding structure walls 11*c* and 11*d* while causing the side surface 2*a* of the tray 2 to be deformed. As a result, the collision load is quickly and efficiently transmitted to each of the structure walls 11*c* and 11*d* of the cross member 11 via the reinforcement 18.

Also, since the third and fourth structure walls 11*c* and 11*d* continue over the entire longitudinal direction of the cross member 11, the upper and lower flange portions 18*b* and 18*c* of the reinforcement 18 on the left side are pressed via the left end of each of the structure walls 11*c* and 11*d*, and the side frame 6 on the left side is further pressed. In this manner, the collision load is dispersed to the side frame 6 on the left side via the side frame 6 on the right side, the reinforcement 18 on the right side, the cross member 11, and the reinforcement 18 on the left side and is further dispersed to the vehicle body side.

As described above, since the cross member 11 and the left and right reinforcements 18 also function as the load path structures in addition to the existing paths illustrated by the arrows F2 and F3 as described above, it is possible to satisfactorily disperse and absorb the collision load input due to side collision at each part of the vehicle body and thereby to reduce deformation of the vehicle body.

Additionally, if the collision load is quickly transmitted to the side of the cross member 11 via the reinforcements 18, the input of the collision load to the cell modules 3 is reduced correspondingly, and the effect of preventing damage is enhanced.

Furthermore, the formation of the upper and lower notches 16 and 17 in the cross member 11 also contributes to the prevention of damage of the cell modules 3.

Figure 4:
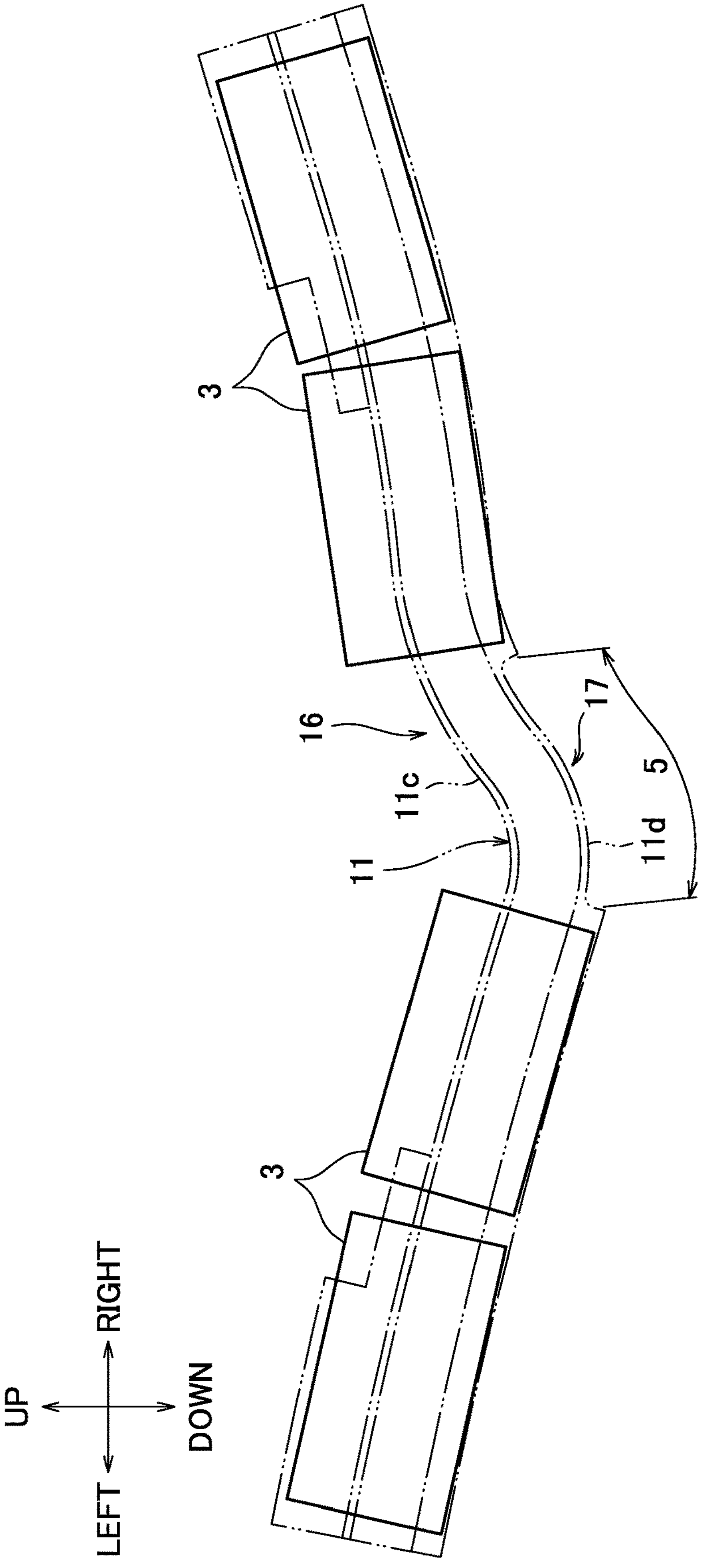
FIG. 4 is a schematic view corresponding to FIG. 3 and illustrating a deformation state of the cross member at the time of side collision.

The up-down width of the cross member 11 is the narrowest in a region at the center in the left-right direction (illustrated by L in FIG. 2) due to the upper and lower notches 16 and 17, and specifically, the cross member 11 has the narrowest up-down width in a region of the lower notch 17 corresponding to the equipment space 5 between the left and right cell modules 3. Therefore, if a collision load due to side collision is input from the right side, the cross member 11 transmits the collision load from the right side to the left side while mainly causing the region of the lower notch 17 to be significantly deformed as illustrated in FIG. 4, and the lower surface 2*b* of the tray 2 is also deformed in accordance with the deformation state of the cross member 11. As a result, the region of the lower notch 17 in the cross member 11 functions as a crushable zone, is deformed prior to the other regions, and curbs deformation of the regions corresponding to both sides of the lower notch 17. Therefore, deformation of the regions of the lower surface 2*b* of the tray 2 corresponding to the both sides of the lower notch 17 is also curbed, and it is possible to more reliably prevent damage of the cell modules 3 installed in the regions.

Additionally, the point that not only the lower notch 17 but also the upper notch 16 are provided in the cross member 11 significantly contributes to achievement of a prescribed deformation mode in conjunction with the hollow inner structure of the cross member 11. In other words, the cross member 11 is made of aluminum and has a hollow shape, and such a material and an inner structure make it easier to adjust the deformation mode of the cross member 11 when a collision load is input. Also, the deformation mode is more easily adjusted in the case where the notch 16 is formed at the upper edge as well as compared with a case where the notch 17 is formed only at the lower edge of the cross member 11. Since the upper notch 16 is cut down into a stepped shape in the present embodiment, in particular, it is easier to cause stress concentration when the collision load is transmitted as compared with a case where the upper notch 16 is cut down into an oblique shape, for example, and this point is also a factor that makes it easier to adjust the deformation mode. As a result, it is possible to cause the cross member 11 to be deformed in the prescribed deformation mode at the time of side collision and thereby to more reliably prevent damage of the cell modules 3.

Moreover, although the upper notch 16 is formed in consideration of the deformation mode of the cross member 11 in this manner, the region is limited mainly to the center of the cross member 11 in the left-right direction. Therefore, both the left and right sides of the cross member 11 have substantially the same up-down width as that of the side surface 2*a* of the tray 2 as illustrated in FIG. 3, and it is thus possible to protect, with the cross member 11, the cell modules 3 that are located on both the left and right sides and are particularly likely to be damaged at the time of side collision.

Furthermore, the point that the cross member 11 is disposed right above the underfloor cross 9 in the front-rear direction as illustrated in FIG. 3 is also a desirable structure for preventing damage of the cell pack 1. In other words, since the cross member 11 and the underfloor cross 9 with high rigidity coincide in the front-rear direction, it is possible to enhance rigidity of the cell pack 1 and thereby to achieve further protection of the cell modules 3.

Second Embodiment

Next, a second embodiment of a cell pack structure for an electric vehicle that implements the present invention will be described. A difference from the first embodiment is in a sectional shape of reinforcements 18, the other configurations are the same as those in the first embodiment. Description of common parts will thus be omitted by applying the same member numbers thereto, and the difference will be mainly described.

Figure 5:
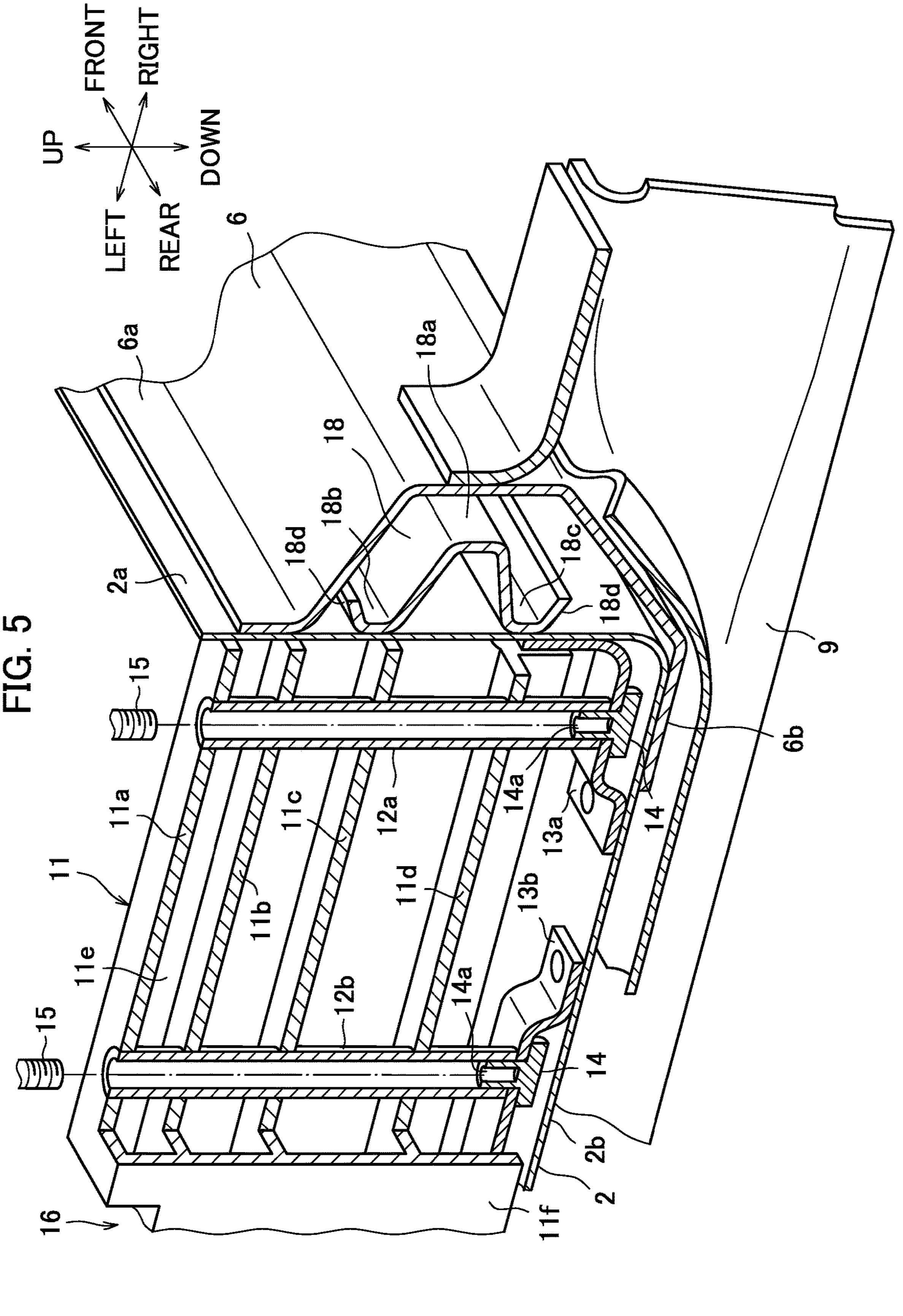
FIG. 5 is a diagram corresponding to FIG. 3 and illustrating a second embodiment in which a sectional shape of a reinforcement is changed.

As illustrated in FIG. 5, each of an upper end of an upper flange portion 18*b* and a lower end of a lower flange portion 18*c* of a reinforcement 18 has a shape floating from a side surface 2*a* of a tray 2, in other words, a warped shape and functions as a reinforcing rib 18*d*. The upper flange portion 18*b* is welded to the side surface 2*a* of the tray 2 on an extension line of a third structure wall 11*c* of a cross member 11 in the up-down direction, and the lower flange portion 18*c* is welded to the side surface 2*a* of the tray 2 on an extension line of a fourth structure wall 11*d* of the cross member 11 in the up-down direction in the present embodiment as well. Therefore, although repeated description is not provided, it is possible to quickly and efficiently transmit a collision load to each of the structure walls 11*c* and 11*d* of the cross member 11 via the reinforcements 18 at the time of side collision and thereby to achieve the effect similar to that of the first embodiment.

Although the description of the embodiments will end now, aspects of the present invention are not limited to the embodiments. Although the above embodiments are implemented as the cell packs for the plug-in hybrid vehicle, for example, the present invention is not limited thereto and may be applied to an ordinary hybrid vehicle or an electric car with only a motor mounted therein.

EXPLANATION OF REFERENCE SIGNS

1 Cell pack
2 Tray
3 Cell module
5 Equipment space (clearance)
9 Underfloor cross
11 Cross member
11*c* Third structure wall (upper structure wall)
11*d* Fourth structure wall (lower structure wall)
16 Upper notch (notch, first notch)
17 Lower notch (second notch)
18 Reinforcement
18*b* Upper flange portion
18*c* Lower flange portion

The invention claimed is:

1. A cell pack structure for an electric vehicle comprising:

a tray in which cell modules are accommodated;

a cross member that is disposed to cross inside of the tray, includes an upper structure wall and a lower structure wall formed to continue over an entire longitudinal direction at positions separated in an up-down direction, and has a hollow shape; and a pair of reinforcements that are each disposed to correspond to both ends of the cross member, and are joined to outside of a side surface of the tray on an extension line of at least one of the upper structure wall and the lower structure wall of the cross member in the up-down direction, wherein the cell modules are disposed to be separated in the longitudinal direction of the cross member in a two-divided manner, and the cross member includes a notch formed in at least one of an upper edge and a lower edge to correspond to a clearance between the cell modules and thus has a narrowed up-down width.

2. The cell pack structure for an electric vehicle according to claim 1, wherein the cross member includes a first notch formed in at least any one of an upper edge and a lower edge to correspond to a clearance between the cell modules and a second notch formed in any other one and thus has a narrowed up-down width.

3. The cell pack structure for an electric vehicle according to claim 2, wherein the second notch has a stepped shape lowering from both sides of the cross member to a center.

4. The cell pack structure for an electric vehicle according to claim 1, wherein the cross member is disposed right above an underfloor cross fixed to a lower surface of the tray to support the cell pack on a vehicle body side.

* * * * *